(12) United States Patent
Ancin et al.

(10) Patent No.: US 11,570,110 B2
(45) Date of Patent: Jan. 31, 2023

(54) CLOUD SYSTEM ARCHITECTURE AND WORKLOAD MANAGEMENT

(71) Applicant: SAP SE, Walldorf (DE)

(72) Inventors: Hakan Ancin, Los Gatos, CA (US); Manish Marathe, Fremont, CA (US); Elvan Roesch, San Mateo, CA (US); Shyam Sunder Reddy Avula, San Ramon, CA (US); Ajay Chitturi, Fairfax Station, VA (US); Sunil Madan, Mountain House, CA (US); Abhishek Pandey, Santa Clara, CA (US); Shailendra Nanduri, Herndon, VA (US); Padmakumar Sudharma Kumari, Herndon, VA (US); Sreedhar Maddineedi, Fremont, CA (US); Girish Manwani, Fremont, CA (US); Zaiyong Yao, Shanghai (CN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/466,252

(22) Filed: Sep. 3, 2021

(65) Prior Publication Data
US 2022/0109632 A1 Apr. 7, 2022

Related U.S. Application Data

(60) Provisional application No. 63/087,739, filed on Oct. 5, 2020.

(51) Int. Cl.
*H04L 47/125* (2022.01)
*H04L 47/762* (2022.01)
(Continued)

(52) U.S. Cl.
CPC .......... *H04L 47/125* (2013.01); *H04L 45/745* (2013.01); *H04L 47/2483* (2013.01); *H04L 47/762* (2013.01); *H04L 47/781* (2013.01)

(58) Field of Classification Search
CPC . H04L 47/125; H04L 45/745; H04L 47/2483; H04L 47/762; H04L 47/781
See application file for complete search history.

(56) References Cited

U.S. PATENT DOCUMENTS

2013/0275550 A1* 10/2013 Lee ..................... G06F 16/2471
709/217
2018/0246945 A1* 8/2018 Lee ..................... G06F 11/3476
(Continued)

*Primary Examiner* — Oleg Survillo
*Assistant Examiner* — Monishwar Mohan
(74) *Attorney, Agent, or Firm* — Fountainhead Law Group P.C.

(57) ABSTRACT

Embodiments offer a cloud system allowing workload management through the use of a zone-compartment architecture. A routing engine extracts an identifier from an incoming request to a cloud system. The routing engine then determines from a mapping in a service mesh, a target compartment corresponding to the identifier. Based upon the target compartment, the routing engine receives an IP address from a registry of the service mesh. Using the IP address, the routing engine routes the request to the target compartment for processing by an application. A database of the target compartment is replicated within another compartment within a different zone, thereby ensuring high availability. Based upon a recommendation provided by the zone, the target compartment may be split or merged to accommodate variations in workflow. The mapping and registry are updated according to changes in the compartments.

20 Claims, 17 Drawing Sheets

(51) Int. Cl.
*H04L 47/2483* (2022.01)
*H04L 45/745* (2022.01)
*H04L 47/78* (2022.01)

(56) References Cited

U.S. PATENT DOCUMENTS

2020/0125453 A1* 4/2020 Kommera ............ G06F 11/1464
2020/0285652 A1* 9/2020 Wang ...................... H04L 67/60
2021/0019194 A1* 1/2021 Bahl ..................... G06F 9/3877
2022/0060513 A1* 2/2022 Gattu .................... H04W 12/08

\* cited by examiner

After Merge

FIG. 12

CompanyIDDBMap
(CompanyA, DB1) ← Key = CompanyA, value = DB1
(CompanyB, DB1)
(CompanyC, DB2)
(CompanyD, DB2)

DBSwimlaneMap
(DB1, sw1)
(DB2, sw2)

Swimlanes
 sw1
  active = true
  fallback = sw2
  az = az1 sw2
  active = true
  fallback = sw1
  az = az2

FIG. 13

CompanyIDDBMap
  (CompanyA, DB1) ← Key = CompanyA, value = DB1
  (CompanyB, DB1)
  (CompanyC, DB2)
  (CompanyD, DB2)

DBSwimlaneMap
  (DB1, sw1)
  (DB2, sw2)

Swimlanes
  sw1
    active = false
    fallback = sw2
    az = az1 sw2
    active = true
    fallback = sw1
    az = az2

FIG. 14A

CompanyIDDBMap
  (CompanyA, DB1) ← Key = CompanyA, value = DB1
  (CompanyB, DB2)
  (CompanyC, DB3)
  (CompanyD, DB4)

DBSwimlaneMap
  (DB1, sw1)
  (DB2, sw1)
  (DB3, sw2)
  (DB4, sw2)

Swimlanes
  sw1
    active = true
    fallback = sw2
    az = az1 sw2
    active = true
    fallback = sw1
    az = az2

FIG. 14B

CompanyIDDBMap
    (CompanyA, DB1) ← Key = CompanyA, value = DB1
    (CompanyB, DB2)
    (CompanyC, DB3)
    (CompanyD, DB4)

DBSwimlaneMap
    (DB1, sw1)
    (DB2, sw3)
    (DB3, sw2)
    (DB4, sw4)

Swimlanes
    sw1
        active = true
        fallback = sw2
        az = az1
    sw2
        active = true
        fallback = sw1
        az = az2
    sw3
        active = true
        fallback = sw4
        az = az1
    sw4
        active = true
        fallback = sw3
        az = az2

CLOUD SYSTEM ARCHITECTURE AND WORKLOAD MANAGEMENT

CROSS-REFERENCE TO RELATED APPLICATION

The instant nonprovisional patent application claims priority to U.S. Provisional Patent Application No. 63/087,739, filed on Oct. 5, 2020 and which is incorporated by reference in its entirety herein for all purposes.

BACKGROUND

Unless otherwise indicated herein, the approaches described in this section are not prior art to the claims in this application and are not admitted to be prior art by inclusion in this section.

The advent of high communications bandwidth and rapid data handling, allows software services to be deployed on cloud systems at remote servers. Traditionally, such cloud systems have been regarded as being monolithic in nature.

However, such a view assumes all-or-nothing availability. That is, potentially beneficial properties of modern hybrid cloud architectures may be ignored and not leveraged to achieve benefits. For example, hybrid cloud systems can include features such as multi-Availability Zones (AZs), and exhibit properties such as the auto-scaling of resources, and automatic deployment.

SUMMARY

Embodiments offer a cloud system allowing workload management through the use of a zone-compartment architecture. A routing engine extracts an identifier from an incoming request to a cloud system. The routing engine then determines from a mapping in a service mesh, a target compartment corresponding to the identifier. Based upon the target compartment, the routing engine receives an IP address from a registry of the service mesh. Using the IP address, the routing engine routes the request to the target compartment for processing by an application. A database of the target compartment is replicated within another compartment within a different zone, thereby ensuring high availability. Based upon a recommendation provided by the zone, the target compartment may be split or merged to accommodate variations in workflow. The mapping and registry are updated according to changes in the compartments.

The following detailed description and accompanying drawings provide a better understanding of the nature and advantages of various embodiments.

BRIEF DESCRIPTION OF THE DRAWINGS

FIG. 12 shows an initial configuration according to an exemplary embodiment.

FIG. 13 shows an exemplary configuration following a zone failure.

FIG. 14A shows an exemplary configuration prior to a split operation.

FIG. 14B shows an exemplary configuration after a split operation.

DETAILED DESCRIPTION

Described herein are methods and apparatuses that implement workload routing in cloud systems. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
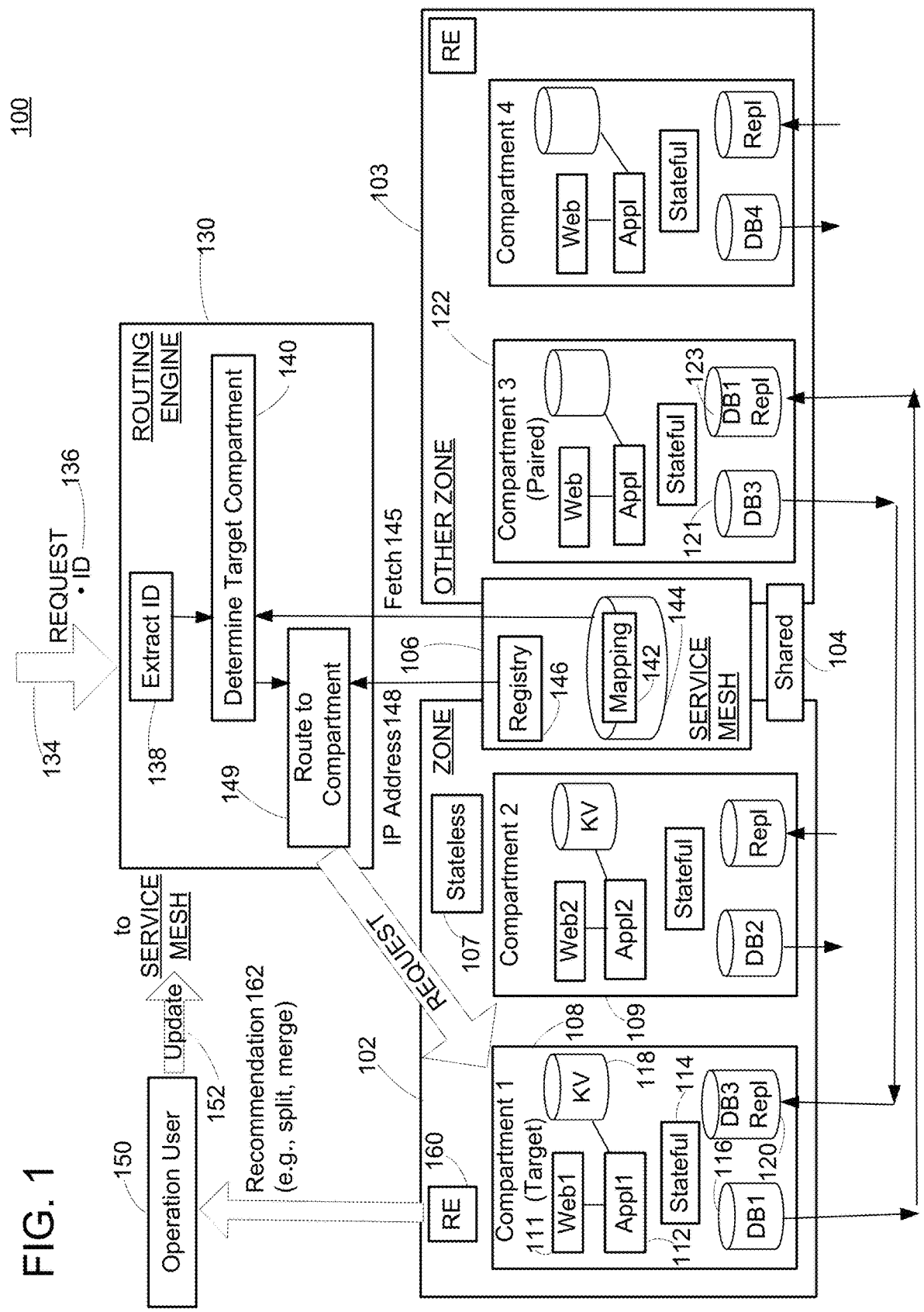
FIG. 1 shows a simplified diagram of a system according to an embodiment.

FIG. 1 shows a simplified view of an example system that is configured to implement workload routing according to an embodiment. Specifically, system 100 comprises a plurality of separate zones 102, 103.

The zones may be located in physically separated geographic regions. However, they are in communication with shared services 104, and also with service mesh 106. Each zone also includes stateless services 107.

The zones are separated into discrete compartments 108, 109. Each compartment includes at least one web server 111 that is in communication with at least one application 112. As discussed herein, an individual compartment is also referred to as a swimlane.

The compartment also includes stateful service(s) 114, and a database 116 for storing data relevant to resident application(s). The application is in communication with a key-value (KV) store 118 for accessing data within the database.

As described in detail below, the compartment also features a replicate database 120. This replicate database is duplicated from the database 121 of another, paired compartment 122 that is located in the different zone 103.

Similarly, a replication of the original compartment database 116 is stored as a duplicate 123 within the paired compartment. Such redundant data storage offers benefits in terms of High Availability (HA) and Disaster Recovery (DR).

The system of FIG. 1 further comprises a routing engine 130 that receives an incoming request 134. The incoming request requires includes an identifier (ID) 136.

The router intercepts the incoming request, and extracts 138 the identifier therefrom. Then, based upon that identifier, the engine determines 140 the appropriate target container for the incoming request. This is done by referring to an ID→Compartment mapping 142 present within non-transitory computer readable store 144.

The mapping reflects namespaces that are defined and utilized in order to determine which cloud system component (e.g., appl) belongs to which compartment(s). Each service discovery and routing between components, is done through the service mesh.

After fetching 145 the target compartment, the router uses the service registry 146 of the service mesh to obtain the appropriate IP address 148 of the target node to route 149 the request. The service mesh store 144 includes the ID→compartment mapping 142, and the status of each compartment.

As discussed below, changes to the ID→compartment mapping may occur over time as a result of activities such as the splitting, merger, and/or failure of compartments. Accordingly, an operation user 150 may provide an update 152 the service mesh store 144.

FIG. 1 further shows the compartments within each zone as sharing a common recommendation engine (RE) 160. As described in detail below, this per-zone recommendation engine is responsible for analyzing incoming workload, and providing recommendations 162 to an operational user. Such recommendations can include splitting an existing compartment into multiple compartments (e.g., to handle increasing loads), or merging multiple existing compartments into a single compartment (e.g., to reflect diminishing loads).

In the manner described above, incoming requests are routed to appropriate, available target compartments within a particular zone. Also, data stored within a compartment is replicated in other zones, to provide for its availability on an ongoing basis, even in the face of potential failures of zones, compartments, and/or databases.

Figure 2:
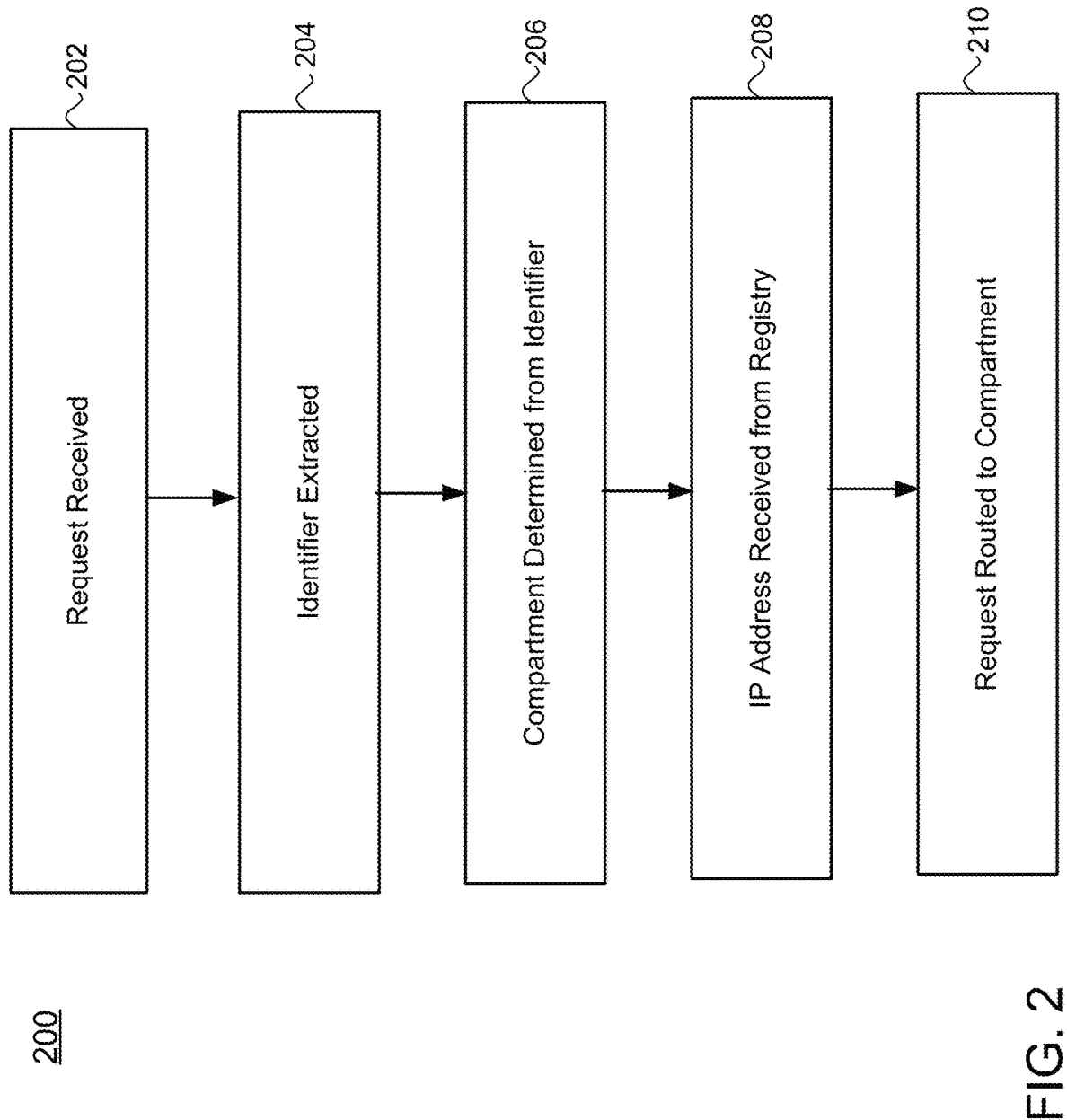
FIG. 2 shows a simplified flow diagram of a method according to an embodiment.

FIG. 2 is a flow diagram of a method 200 according to an embodiment. At 202, an incoming request to a cloud system is received.

At 204, an identifier is extracted from the first request. At 206, a compartment is determined from the identifier and a mapping.

At 208, an IP address of the compartment is received from a registry. At 210, the request is routed to the compartment using the IP address, for processing by an application within the compartment.

Systems and methods for workload routing according to embodiments, may avoid one or more issues associated with cloud systems whose workload is routed in a monolithic fashion. For example, the failure of even a single application component on a monolithic cloud system, may result in failure of the entire application.

Also, because component isolation is not available, monolithic cloud systems may tend to exhibit lower resiliency. For example, in monolithic cloud systems the occurrence of infrastructure-level issues (e.g. power supply disruption, and/or network switch failures in one data center) can impact the availability of the entire application for all users.

Furthermore, upgrades for applications hosted on monolithic cloud systems require downtime in order to implement. Such downtime adds to the expense of hosting of applications by cloud systems.

Moreover, cloud systems whose workload distribution is routed in a monolithic manner, may be unable to effectively scale resources based on increased workload by specific customers. Thus a surge in demand by one customer can adversely impact other, unrelated customers.

Another potential benefit offered by embodiments, is enhanced performance. That is, cross-AZ communication is relatively resource consumptive as compared with communication that occurs within an AZ. Here, embodiments allow not only individual applications to be deployed in swimlanes in a same AZ, but also deployment within swimlanes of suites of related applications that utilize common data stores.

Swimlanes are designed to serve multiple workloads/application to be deployed. More than one application may be served in a swimlane. The data store layer component (key-value store; message queues; relational databases; data stores) can be shared by these services. The data store layer component will serve these services as different tenants. Sharing the swimlane with other services will reduce the network latency and improves the performance if services in the same swimlane need to talk to each other. Sharing the data store layer means reduction in server count which translates to a reduction in cost.

Lastly, it is noted that cloud systems that are administered in a monolithic manner may require separate strategies for High Availability and Disaster Recovery (DR). Implementing separate strategies for these objectives can be complex and increase costs.

By contrast, embodiments allow using HA as DR in active-active deployments, thereby saving money. In particular, DR is not seamless. Every DR situation requires downtime. Generally, all DR solutions have an associated RTO (Recovery Time Objective), and RPO (Recovery Point Objective). The goal is to avoid DR and address the requirements with an HA solution. According to embodiments, HA with swimlanes will eliminate most of the scenarios where otherwise DR would be required.

With the swimlane design according to embodiments, each customer has its data synchronized to another swimlane in another AZ. Any unforeseen problem happening at one AZ will not lead to DR. Instead embodiments will serve those clients from the AZ pairing. This will guarantee a seamless experience to the clients without incurring any downtime.

Further details regarding workload routing according to various embodiments, are now provided in connection with the following example.

EXAMPLE

Figure 3:
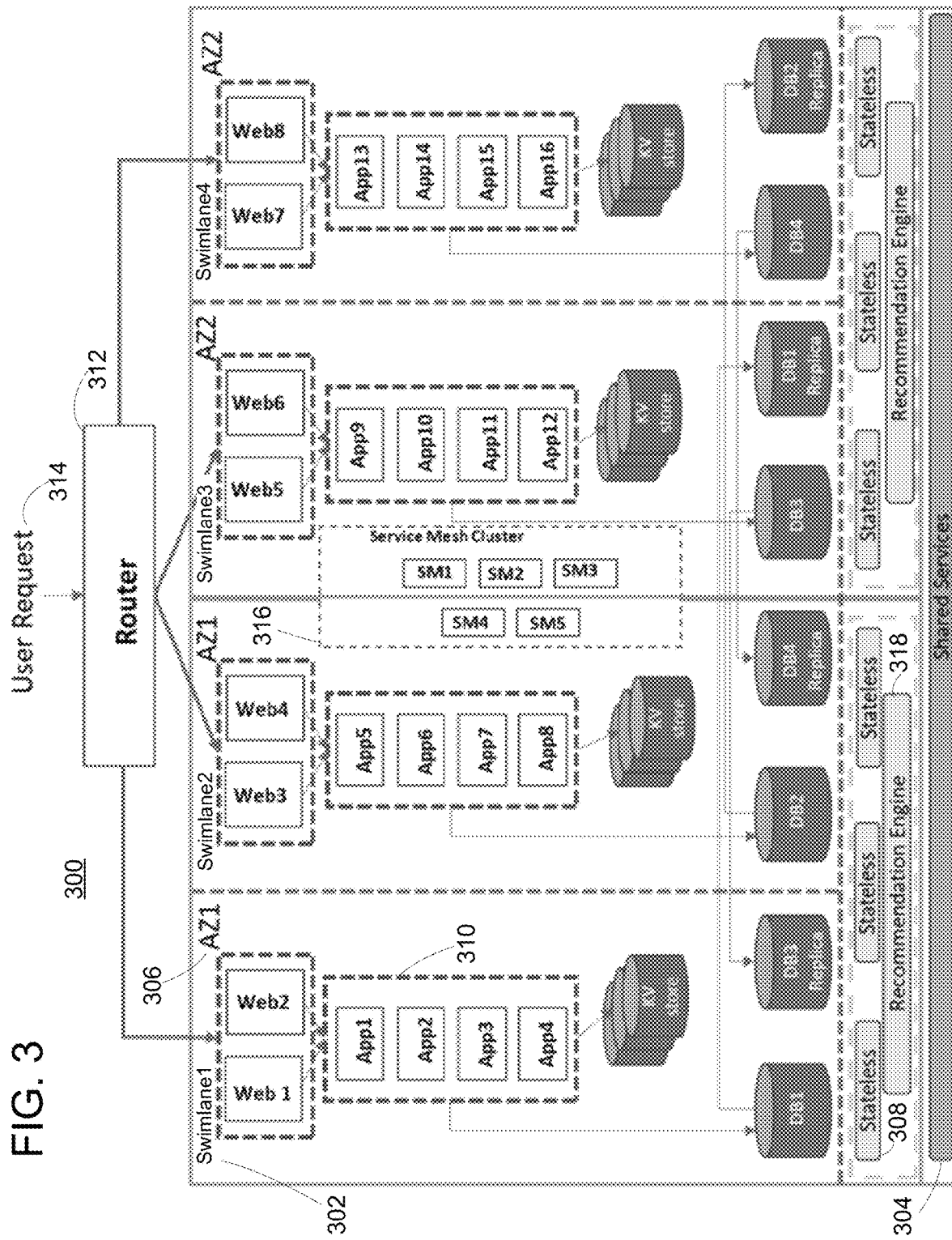
FIG. 3 shows a simplified view of an architecture for a cloud system according to an exemplary embodiment.

FIG. 3 shows a simplified view of an architecture 300 for a cloud system according to an embodiment. Here, swim lanes 302 are defined so that each swimlane supports a distinctive set of customers.

The placement of customers into swim lanes is primarily decided by the workload. In addition, it is possible to consider additional criteria for such placement.

Components of the application (whether monolithic or microservices) are split into stateful, stateless, and shared services.

Shared services 304 are the services which cannot be split based on the customer tenant id. Shared services will be deployed in all AZs 306 for high availability.

Stateless services 308 are deployed in all AZs to minimize cross-AZ traffic. Cross AZ traffic reduces performance and increases costs due to network charges.

The placement of stateful applications 310 inside swimlanes, is determined by the resource requirement of the workload and cost.

The new component Application-level router 312 achieves workload distribution in the cloud network. The router:
  intercepts each incoming request 314,
  uses the service mesh KV store 316 to find the swimlane the customer data resides in, and
  routes the request to the appropriate swimlane.

Each swimlane has a pair defined in another availability zone. In FIG. 3, swim lane 3 is the pair of swim lane 1.

When a swimlane fails, the workload will be redirected by the router to its pair. This setup provides redundancy and High Availability.

Namespaces are defined and utilized to determine which component belongs to which swimlane(s). Each Service discovery and routing between components is done through a service mesh.

The deployment architecture supports the components irrespective of them being deployed in Virtual Machines (VMs) or containers. Components are written, and software is chosen, so that the deployment architecture works in hybrid clouds.

A recommendation engine 318 in FIG. 3 will function to perform the following:
  analyze the data traffic volume per customer within each swimlane;
  use these statistics or metrics to make decisions whether to create more swimlanes or reduce the number of swimlanes;
  analyze the traffic at the server level within each swimlane and provides recommendations whether to add/drop servers to optimize cost;
  optimize cross-AZ traffic by recommending moving customers from one swimlane to another depending on traffic volume—this leads to better rate limiting and quality of service for the customers;
  data store for this service can be time series DB or any relational DB.

Cloud system architectures according to embodiments may offer one or more benefits as listed below.

1) Isolation of workloads. The failure of one swimlane does not affect the operation of other swimlanes.

2) When a data store fails, an application will be able to seamlessly failover to access data stores replicated in another AZ.

3) When the whole AZ is down, applications can seamlessly failover to other AZs.

4) Each swimlane can be updated and maintained independent from each other. A component of one swimlane can be updated to a new service version and tested independently from other swimlanes. Different customers can run different versions of service concurrently. Canary deployments are allowed.

5) Each component can be scaled up/down based on workloads.

6) Cross AZ communication is minimized resulting in improving performance and reduced costs.

7) Swimlanes can be split to more swimlanes or can be merged into an existing swimlane if the transaction volume reduces.

8) Swimlane design is also used to increase common service usage within swimlanes and hence reducing internal network traffic.

9) Not only individual applications can be deployed in swimlanes, but also pools of applications using common data stores can be deployed in swimlanes. This pattern can be especially beneficial, for specialized relational databases to be used more cost efficiently within a same VM with different UIDs.

10) Multi swimlane design can be extended for DR. This leads to active-active multi-regional deployments and saves substantial amounts of money.

11) Swimlanes offer more granular availability and downtime reports. This will provide not only better availability estimates but also the ability to compute availability numbers for individual customers.

Figure 4:
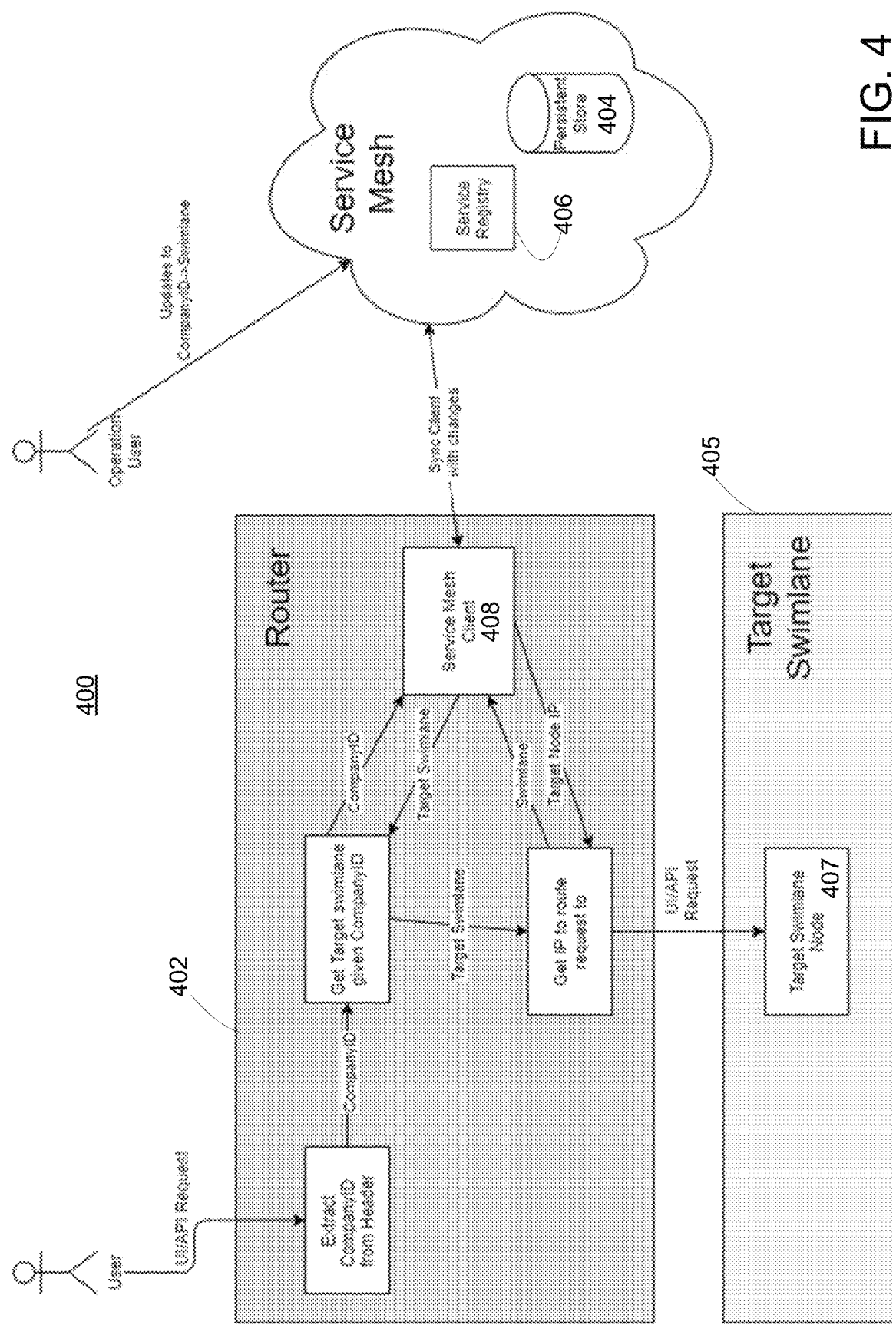
FIG. 4 is a simplified view showing the operation of a router according to an exemplary embodiment.

Details regarding operation of the component application-level router are now discussed. FIG. 4 is a simplified view showing the operation of a router 400 according to an exemplary embodiment.

The application-level router:
  intercepts each incoming request 402,
  extracts CompanyID from the request, and
  uses the Service Mesh KV store 404 for the CompanyID→Swimlane mapping to determine the target swimlane 405.

Each swimlane has a pair defined. When a swimlane goes down, all the components of that swimlane will failover to its pair swimlane. Thus if the swimlane in which the company resides is currently down, then its pair swimlane is returned as the target swimlane.

After fetching the target swimlane, the router then uses the Service Mesh's service registry 406 to get IP of the target node 407 to route the request.

Service Mesh KV stores the CompanyID→Swimlane mapping, and each Swimlane's status. Any changes to the CompanyID→Swimlane mapping are updated in the Service Mesh KV store by Operation User.

And, these changes are pushed to Service Mesh Client 408. Also, when the AZ or Swimlane goes down, the service mesh updates its status and the status is propagated to all service mesh clients.

Swimlane Namespaces and Configuration are now discussed. 1) Swimlane namespaces are defined as sw[number]-az[number], i.e.: sw1-az1.

Services inside the swimlane will be mapped to a namespace. For example:
  application servers (app1, app2) in sw1 will be registered to service app-sw1-az1,
  application servers (app3, app4) in sw2 will be registered to service app-sw2-az2,
  web servers (web1, web2) in sw1 will be registered to service web-sw1-az1,
  and so on.

2) Stateless services are registered in the AZ namespace. For example, servers of stateless service stless1 will be registered to stless1-az1.

3) Each swimlane has a pair swimlane (fallback) defined and this information is stored in the Service Mesh configuration. Each swimlane will have its configuration stored as below:

sw1
  active=true
  fallback=sw2
  az=az1
sw2
  active=true
  fallback=sw1
  az=az2

4) The CompanyID→Swimlane mapping is stored in the Service Mesh configuration as below:
CompanyIDDBMap
DBSwimlaneMap For example, we have four companies—CompanyA, CompanyB, CompanyC, CompanyD.
CompanyA & CompanyB reside in DB1
CompanyC & CompanyD reside in DB2
DB1 is in swimlane1
DB2 is in swimlane2
Then, the configuration will look like that shown in FIG. 12.

The router will use CompanyIDDBMap, DBSwimlaneMap, and the swimlane status to determine (CompanyID→Swimlane mapping). For example CompanyA is in sw1, CompanyC is in sw2 and so on If sw1 is down, then sw1→active is set to "false". (This is shown in FIG. 13, discussed below). And CompanyA will be routed to sw2 (sw2 is the pair swimlane of sw1).

5) Each database is deployed with High Availability and the replica node is deployed in its Swimlane's pair. For example, DB1 which is in sw1 will have its replica deployed in sw2 (sw1's pair).

Figure 5:
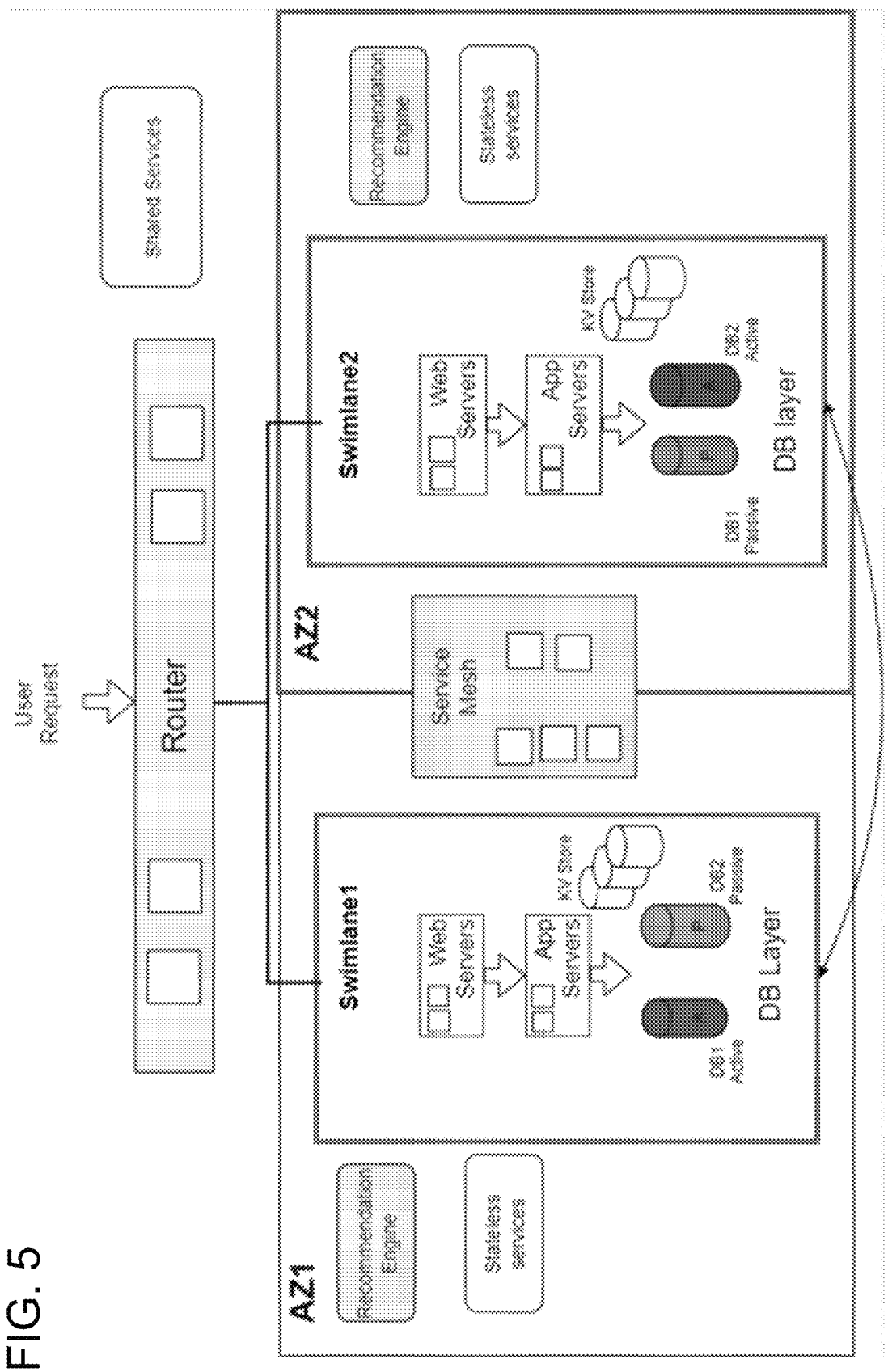
FIG. 5 shows a simplified view of an initial deployment scenario according to an exemplary embodiment.

A deployment example and scenarios are now discussed. FIG. 5 is a simplified view showing an initial deployment scenario. Here, an application is deployed in 2 AZ's: AZ1 and AZ2.

Two swimlanes are defined: Swimlane1 (sw1) in AZ1 and Swimlane2 (sw2) in AZ2. Shared services are deployed as active to all AZs (instance is deployed as a cluster to enable High Availability so that when one AZ goes down, the shared services are still accessible).

Example shared services are:
Service Mesh
Router

Stateless services are deployed in all AZs. The Recommendation Engine is a stateless service which monitors, analyzes the services (including swimlanes), and recommends actions.

Service Registration is discussed as follows.
Application servers (app1, app2) in sw1 will be registered to service app-sw1-az1
Application servers (app3, app4) in sw2 will be registered to service app-sw2-az2
Web servers (web1, web2) in sw1 will be registered to service web-sw1-az1
and so, on Databases are discussed as follows. There are two databases: DB1 & DB2.
DB1 resides in Swimlane1. DB1 replica resides in Swimlane2 (swimlane1's pair).
DB2 resides in Swimlane2. DB2 replica resides in Swimlane1 (swimlane2's pair).

Let's say four companies are served by the application: CompanyA, CompanyB reside in DB1; CompanyC, CompanyD reside in DB2.

According to this initial deployment, swimlane configuration will look as in FIG. 12 during normal operation. The router will use the CompanyIDDBMap, DBSwimlaneMap and swimlane status to determine (CompanyID→Swimlane mapping). For example, CompanyA is in sw1, CompanyC is in sw2, and so on.

The following steps show the details of how a user request is handled by the system. The user request will be served by the swimlane where the company data resides thereby achieving workload isolation for a given company.

1) User1 from CompanyA tries to communicate with the application by sending an UI request.
2) This login request is intercepted by the router which then queries on the service mesh and determines that CompanyA is in Swimlane1. The router then routes the request to one of the webservers in Swimlane1.
3) The web server in Swimlane1 processes the request and forwards the request to the app server in the same swimlane—Swimlane1 using the service Mesh discovery method.
4) The app server then talks to the DB in swimlane1 to complete the request processing.

This approach ensures that a company requests will be serviced by the swimlane in which its data resides resulting in minimal cross-AZ traffic.

Figure 6:
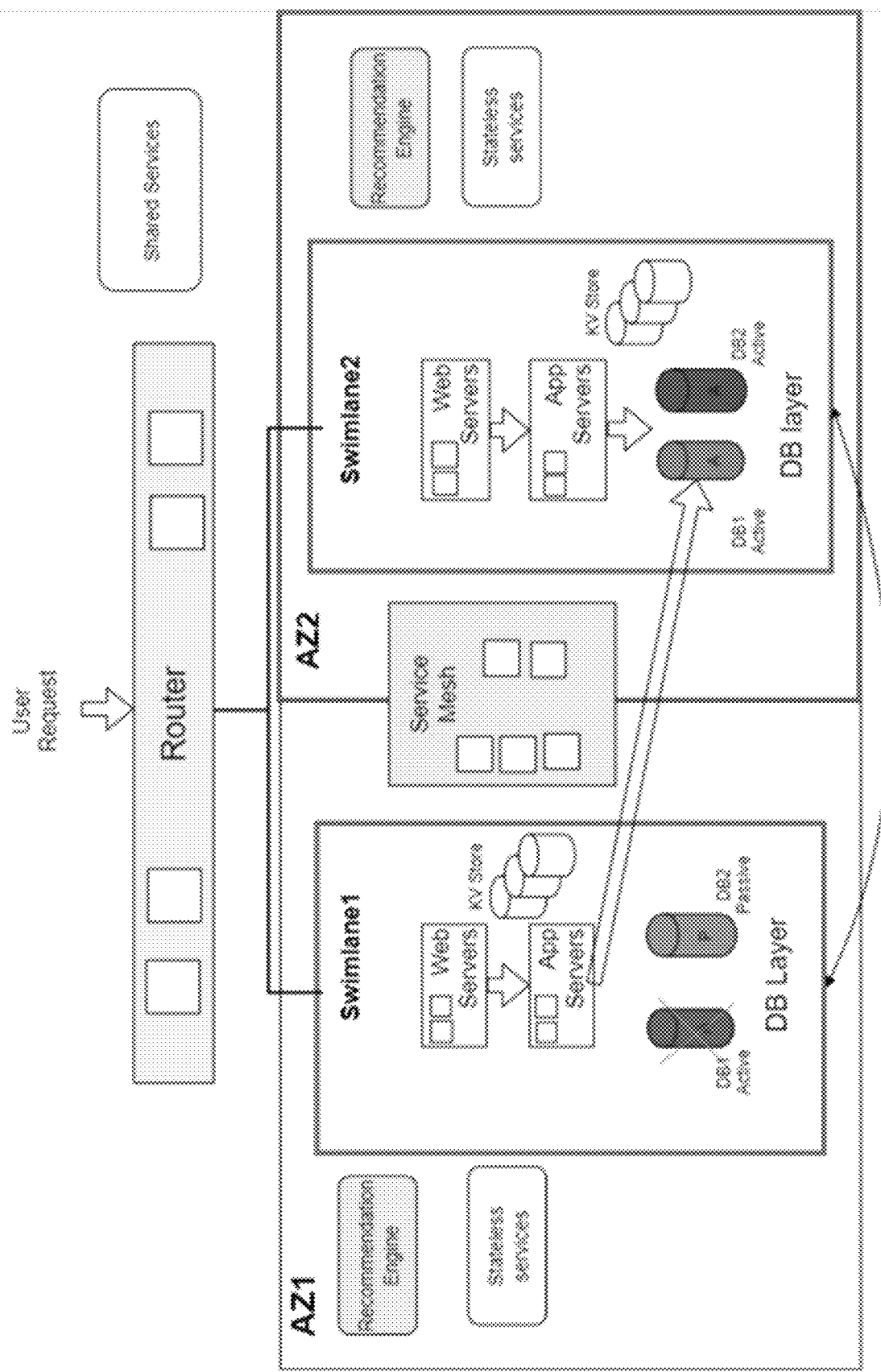
FIG. 6 shows a simplified view of a database failure scenario according to an exemplary embodiment.

A database failure scenario is now discussed. FIG. 6 shows such a database failure scenario.

This example assumes that the DB1 instance is down. The replica of DB1 which resides in Swimlane2 becomes active.

The application servers in Swimlane1 connect to the DB1 in Swimlane2. DB1 replica now becomes active and application servers in Swimlane1 will connect to the DB1 in Swimlane2.

No change is done to the swimlane configuration in consul when only a database has failed over to its replica.

Figure 7:
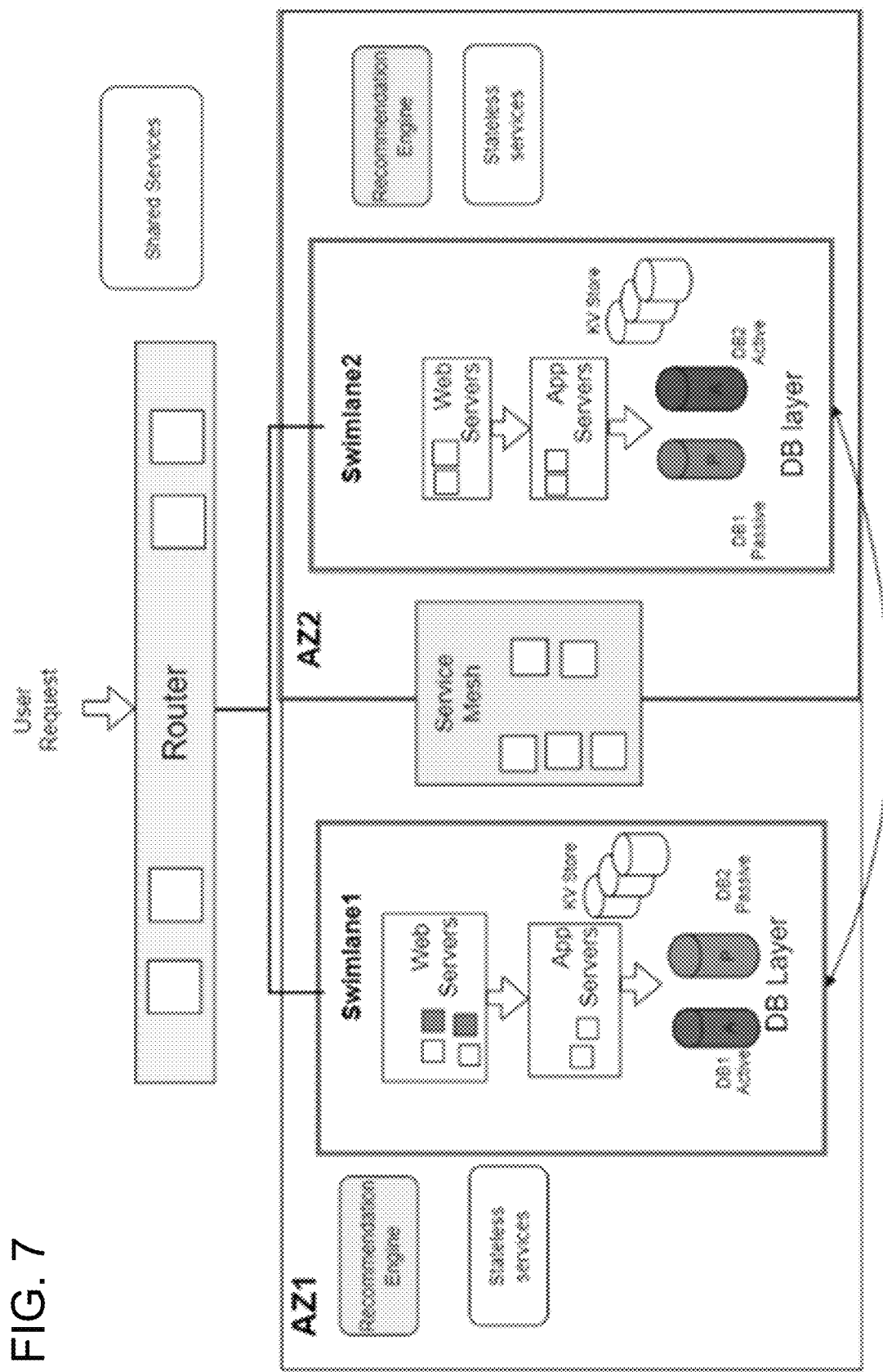
FIG. 7 shows a simplified view of a deployment scenario with server nodes added.

Another deployment scenario involves adding/dropping server nodes w.r.t Increased/Reduced workload. FIG. 7 shows a simplified view of a scenario with server nodes are being added.

In this example, the web servers in Swimlane1 are heavily loaded (high CPU/memory utilization) and not able to handle the incoming workload. The recommendation engine which analyzes the logs recommends adding a web server instance to Swimlane1.

Then web servers will be scaled up by adding one or more web server instances to Swimlane1. This new web server instance(s) will be registered to Swimlane1's web server service in the service mesh.

Similarly, when the workload is reduced, one or more web server instances can be dropped. Other services can add and/or drop server nodes in the same fashion.

Figure 8:
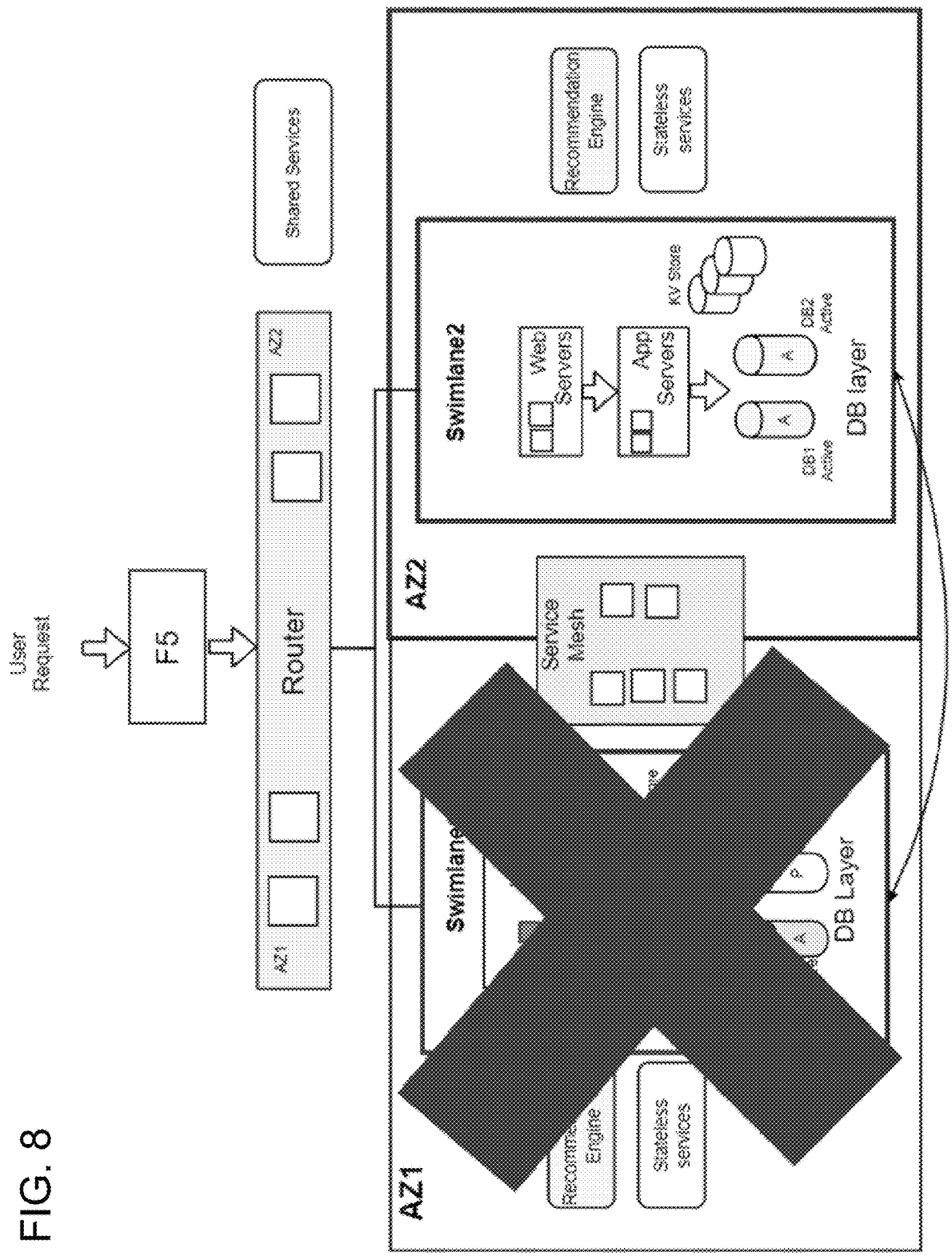
FIG. 8 shows a simplified view of a zone failure scenario according to an exemplary embodiment.

Still another deployment scenario involves failure of an AZ. FIG. 8 is a simplified view showing a scenario in which an AZ fails.

In this failure scenario, AZ1 is down because of some network/infrastructure issue. When AZ1 goes down, the cloud provider publishes events/alerts. This information is received by all the services.

The recommendation engine changes the swimlane configurations. All the swimlanes in AZ1 are marked as down.

Swimlane configuration will look as in FIG. 13 after AZ1 goes down. The router will use the CompanyIDDBMap, DBSwimlaneMap mapping and the Swimlane status to determine (CompanyID→Swimlane mapping). The router will route CompanyA requests to Swimlane2, CompanyC requests to Swimlane2, and so on.

Swimlane split and merge operations are now discussed. Swimlane split operations create two swimlanes out of one swimlane.

The split operation needs to happen at the pair swimlane too. Splitting one swimlane involves splitting that swimlane and its pair.

Figure 9:
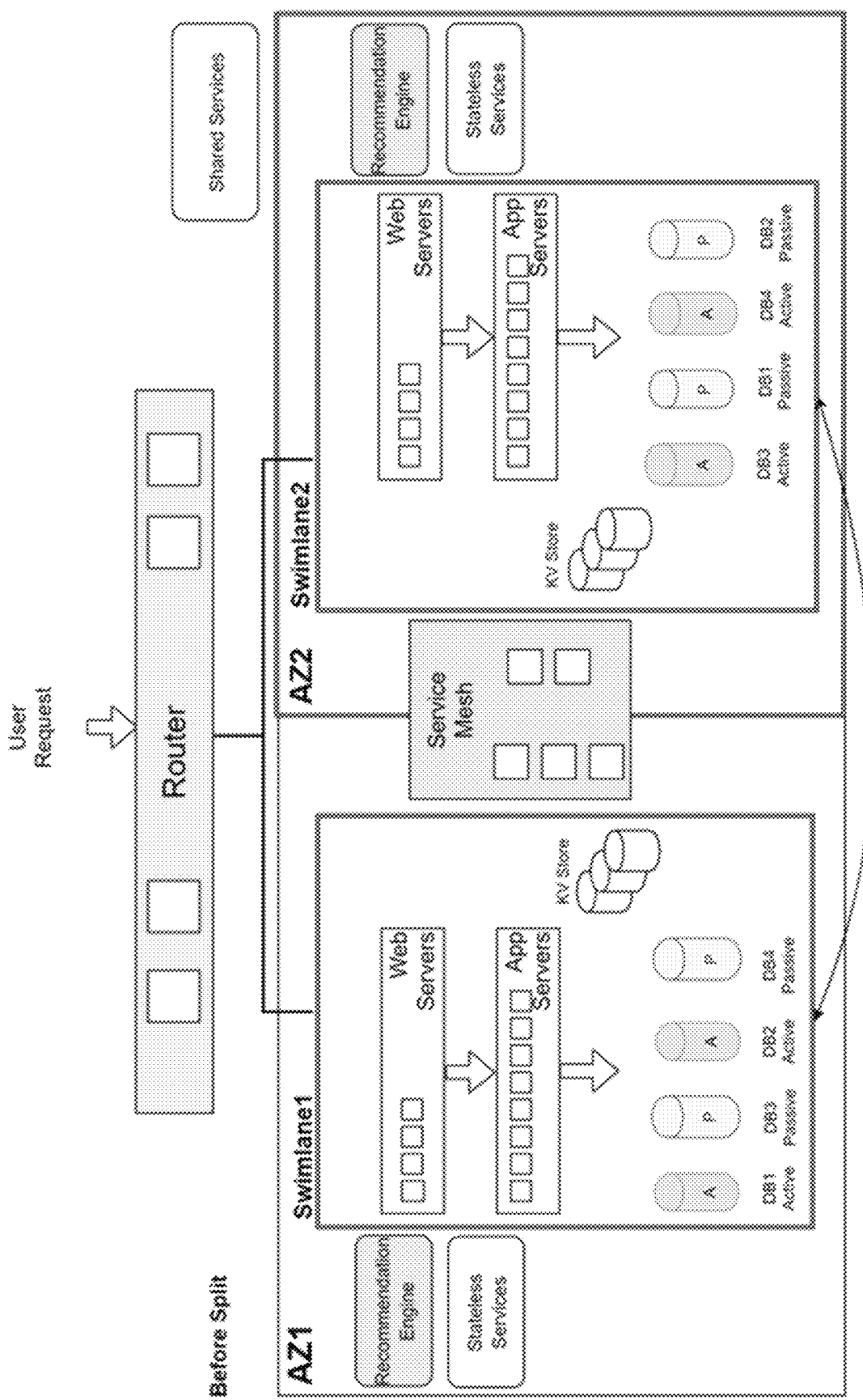
FIG. 9 shows a simplified view of an exemplary system set up prior to a split operation.

FIG. 9 shows the initial setup with Swimlane1 and its pair Swimlane2 before a split operation. Both swim lanes are active and serving customers.

Split operations will be recommended by the recommendation engine, or may be initiated by the system administrator. At the peak season, when the traffic is much higher than during normal times, having more swimlanes will increase the compute power and will use the database connections more efficiently, increasing the resilience, and performance.

The compute power is increased by provisioning new set of servers in the new swimlane. The database connection pools will be used by reduced number of clients since we split the clients into two swimlanes.

In addition to those advantages it also reduces the performance impact if one of the swimlanes is overloaded. In case of a failure less clients are impacted.

Figure 10:
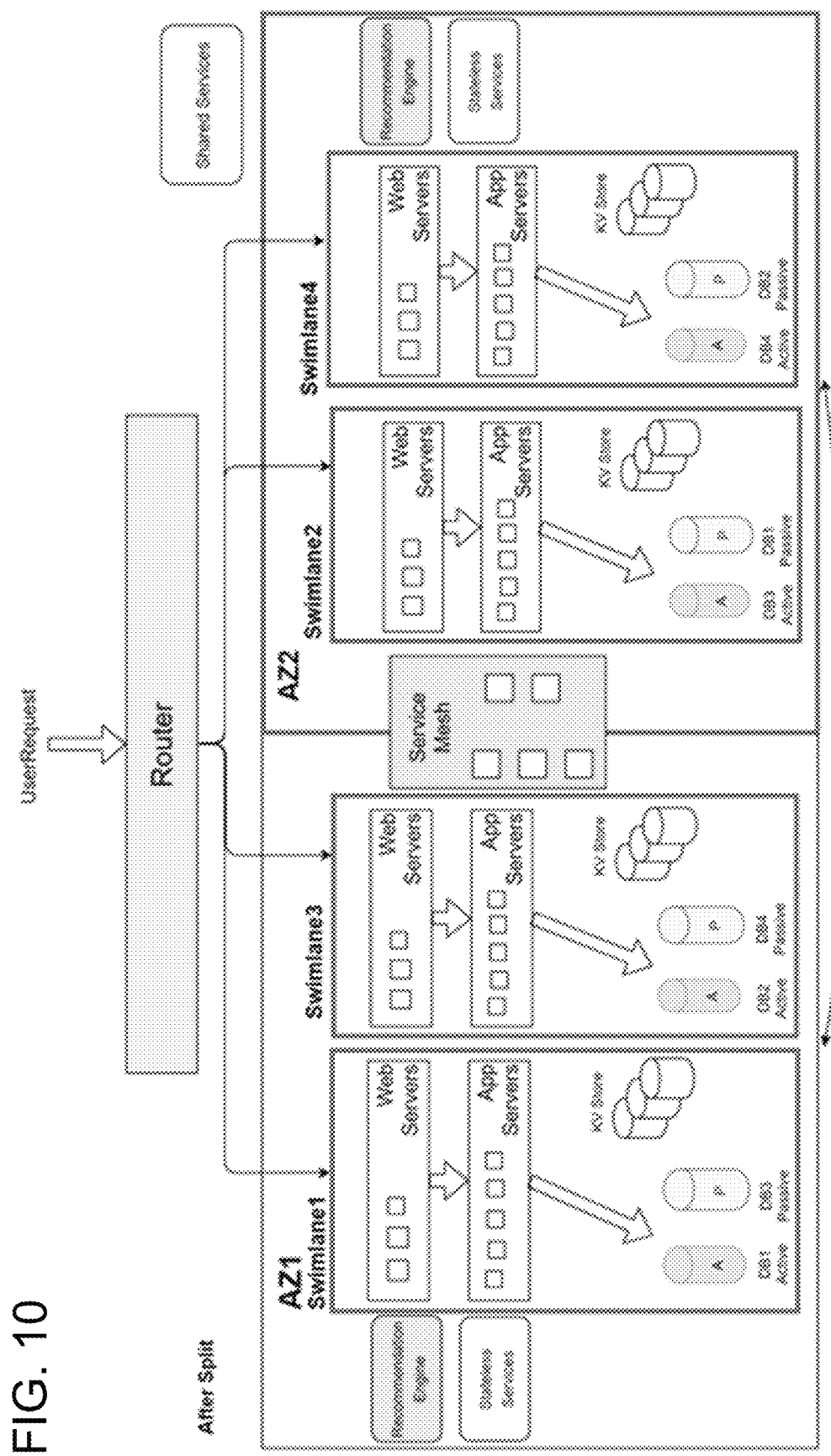
FIG. 10 shows a simplified view of an exemplary system set up after a split operation.

Let's review the split with the example at FIG. 9 (before split) and FIG. 10 (after split). Before the split, we have swimlane1 at AZ1 and swimlane2 at AZ2. Swimlane1's pair is Swimlane2. When we split swimlane1, it means we will split swimlane2 too. Swimlane configuration before split will look as in FIG. 14A.

After the split we will have in AZ1 Swimlane1 and Swimlane3; and in AZ2, Swimlane2 and Swimlane4. Before the split we had four databases in the swimlane1, namely: DB1 Active, DB2 Active, DB3 Passive, DB4 Passive.

After the split Swimlane1 will have two databases, and in Swimlane2 will have the other two databases. That is, after the split we will have two databases in Swimlane1, namely: DB1 Active and DB3 Passive. When we split, we will have another swimlane next to Swimlane1 (Swimlane3). We will see the DB2 Active and DB4 Passive in the newly created Swimlane3.

In order to prepare the split operation, we provision the new swimlanes: Swimlane3 and Swimlane4. We will configure the Web Servers, App Servers in the new swimlanes and configure the access to a subset of the database pools which are in Swimlane3 and Swimlane4 after the split operation completes.

When Swimlane3 and Swimlane4 are ready, the AZ-to-swimlane mapping and the database pool-to-swimlane mapping will be updated in consul. The updated configurations will now route the traffic to all swimlanes. Swimlane configuration after the split will look like as in FIG. 14B.

A swimlane merge operation is now discussed. After the peak season is over, the recommendation engine can suggest merging the swimlanes. Merging the swimlanes will reduce the server count, which helps reducing operational costs.

HA with swimlanes supports seamless merge operations. Merge operations reduce the number of swimlanes.

The merge operation needs to happen at the pair swimlanes too. Merging swimlanes means merging the target swimlanes and their pair swimlanes.

Figure 11:
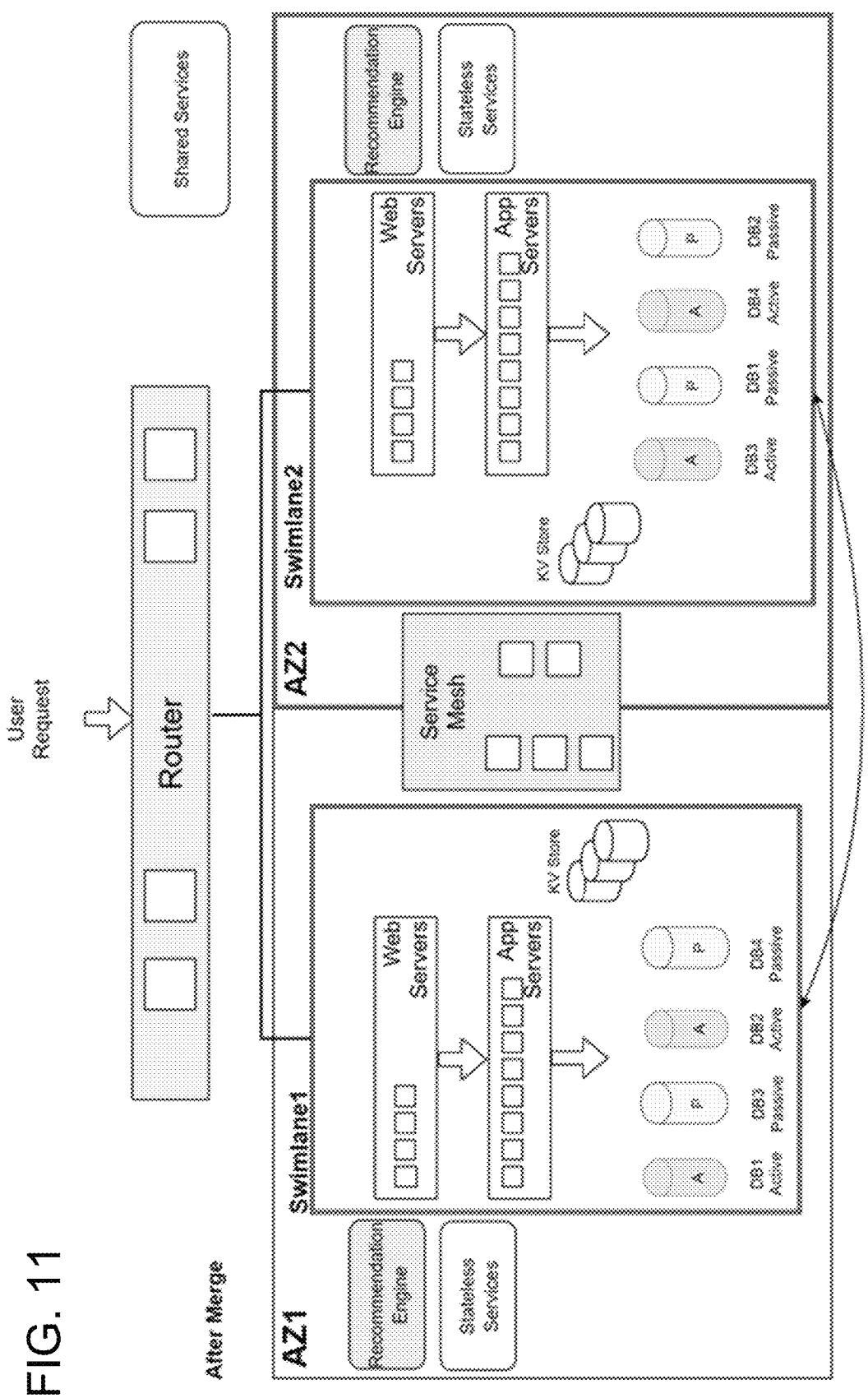
FIG. 11 shows a simplified view of an exemplary system set up after a merge operation.

Let's review the merge with an example at FIGS. 10 and 11. Before the merge (FIG. 10), we have Swimlane1 and Swimlane3 at AZ1 and Swimlane2 and Swimlane4 at AZ2. Swimlane1's pair is Swimlane2, and Swimlane3's pair is Swimlane4.

When Swimlane1 and Swimlane3 are merged in FIG. 11, it will also merge Swimlane2 and Swimlane 4 since merge requires merging the pair swimlanes too. After the merge completes, Swimlane1 is in AZ1 and Swimlane 2 is AZ2.

In order to merge the swimlanes, the AZ-to-swimlane mapping and the database pool-to-swimlane mapping in consul will be updated. The updated configurations will route the traffic to all swimlanes. During the swimlane merge operation the recommendation engine can suggest reducing the number of servers.

Not only individual applications can be deployed in swimlanes. Pools of applications that are using common data stores may also be deployed within swimlanes (this is shown, e.g., with Appl-App4 in swimlane 1 of FIG. 3).

Swimlanes are designed to serve multiple workloads/application to be deployed. It is a common use case to serve more than one application in a swimlane.

The data store layer component (key-value store, message queues, relational databases, data stores) can be shared by these services. The data store layer component will serve these services as different tenants.

Sharing the swimlane with other services will reduce the network latency, improving the performance if services in the same swimlane need to talk to each other.

Sharing the data store layer means reduction in server count which translates to a reduction in cost.

Multi swimlane design can be extended for DR, saving money-→active-active deployments. Disaster recovery (DR) is not seamless. Every DR situation requires downtime. Generally, all DR solutions have an associated RTO (Recovery Time Objective), and RPO (Recovery Point Objective).

Swimlanes can be deployed in multi-region instead of multi-AZ. This will be feasible especially when the network speeds are fast and chattiness between replicating data stores are moderate. This will drastically reduce RPO because applications will fail over to another region and will provide substantial cost savings.

Workload routing that is implemented according to embodiments may offer one or more potential benefits. For example, the isolation of workloads to swimlanes allows swimlanes to operate without being affected by the failure of another swimlane.

Another possible advantage accorded by embodiments, is greater resilience. That is, when data stores fail, an application will be able to seamlessly failover to access data stores replicated in another AZ.

Moreover, resilience is also imparted at the AZ level. That is, even when an entire AZ is unable to operate, a hosted application may failover to other (functioning) AZs.

Embodiments may also reduce expense associated with updating and maintenance. That is, each swimlane can be updated and/or maintained independent from each other—e.g., at times of lower expected demand.

For purposes of implementing updates, embodiments may allow testing to become more flexible. That is, a component of one swimlane can be updated to a new service version and tested independently from other swimlanes.

Embodiments may also impart flexibility in deploying an application between customers. For example, implementation of workload routing according to embodiments readily allow different service versions to be available to different customers.

Embodiments may also impart valuable flexibility for initial deployments. That is, workload routing may readily allow canary deployments to be tried out on a limited number of customers (e.g., to identify any potential issues) before having to be fully released to everyone.

Scalability is yet another possible benefit that may be offered by embodiments. That is, each application component can be scaled up or down based upon actual workloads or even those predicted for the future. Where transaction volume is high, swimlanes can be split to more swimlanes. And, swimlanes can be deleted if the transaction volume reduces.

As noted above, embodiments may be designed to minimize cross-AZ communication. This improves performance and reduces costs of operation.

Moreover, swimlane design is also used to increase common service usage within swimlanes. This desirably reduces internal network traffic.

It is noted that not only individual services can be deployed in swimlanes, but also pool services that use common data stores. Such an arrangement can be particularly beneficial for specialized relational databases to be used more cost efficiently. One example of such circumstances are specialized relational databases with different identifiers (UIDs) that are used within a same Virtual Machine (VM).

It is further noted that embodiments as described herein may allow the elimination of a dedicated Disaster Recovery stack. Instead, applications can be deployed across different (geographic) regions and AZs. This may lead to active-active regional deployments and save money.

Reporting may also be enhanced by adoption of embodiments for workload routing. That is, fine granular availability and downtime reports can be based upon swimlanes. This will provide not only better availability estimates, but also the ability to compute availability numbers for individual customers.

Returning now to FIG. 1, there the particular embodiment is depicted with the engine responsible for routing being located outside of the both the database of the compartment, and outside of the service mesh. However, this is not required.

Rather, alternative embodiments could leverage the processing power of an in-memory database engine (e.g., the in-memory database engine of the HANA in-memory database available from SAP SE), in order to perform various functions.

According to one embodiment, the voluminous data being handled by the application in the first compartment of the first zone, could be stored in an in-memory database. An in-memory database engine of that in-memory database could also be responsible for routing of requests.

According to another embodiment, the store of the service mesh could be an in-memory database. An in-memory database engine of that in-memory database could also be responsible for routing of requests.

Figure 15:
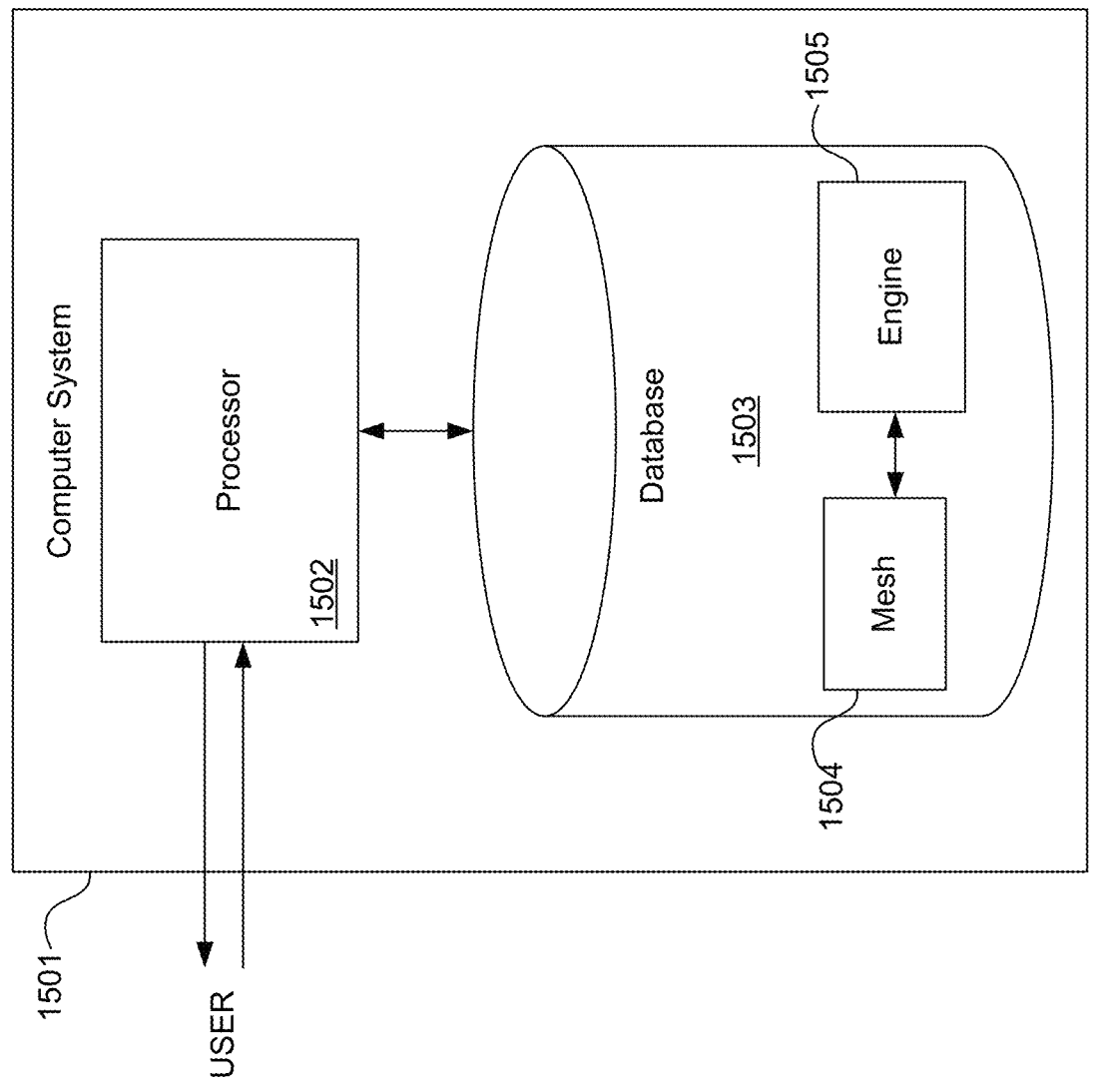
FIG. 15 illustrates hardware of a special purpose computing machine according to an embodiment that is configured to implement workload routing in cloud systems.

Thus FIG. 15 illustrates hardware of a special purpose computing machine configured to implement workload routing according to an embodiment. In particular, computer system 1501 comprises a processor 1502 that is in electronic communication with a non-transitory computer-readable storage medium comprising a database 1503. This computer-readable storage medium has stored thereon code 1505 corresponding to a routing engine. Code 1504 corresponds to a mesh. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 16:
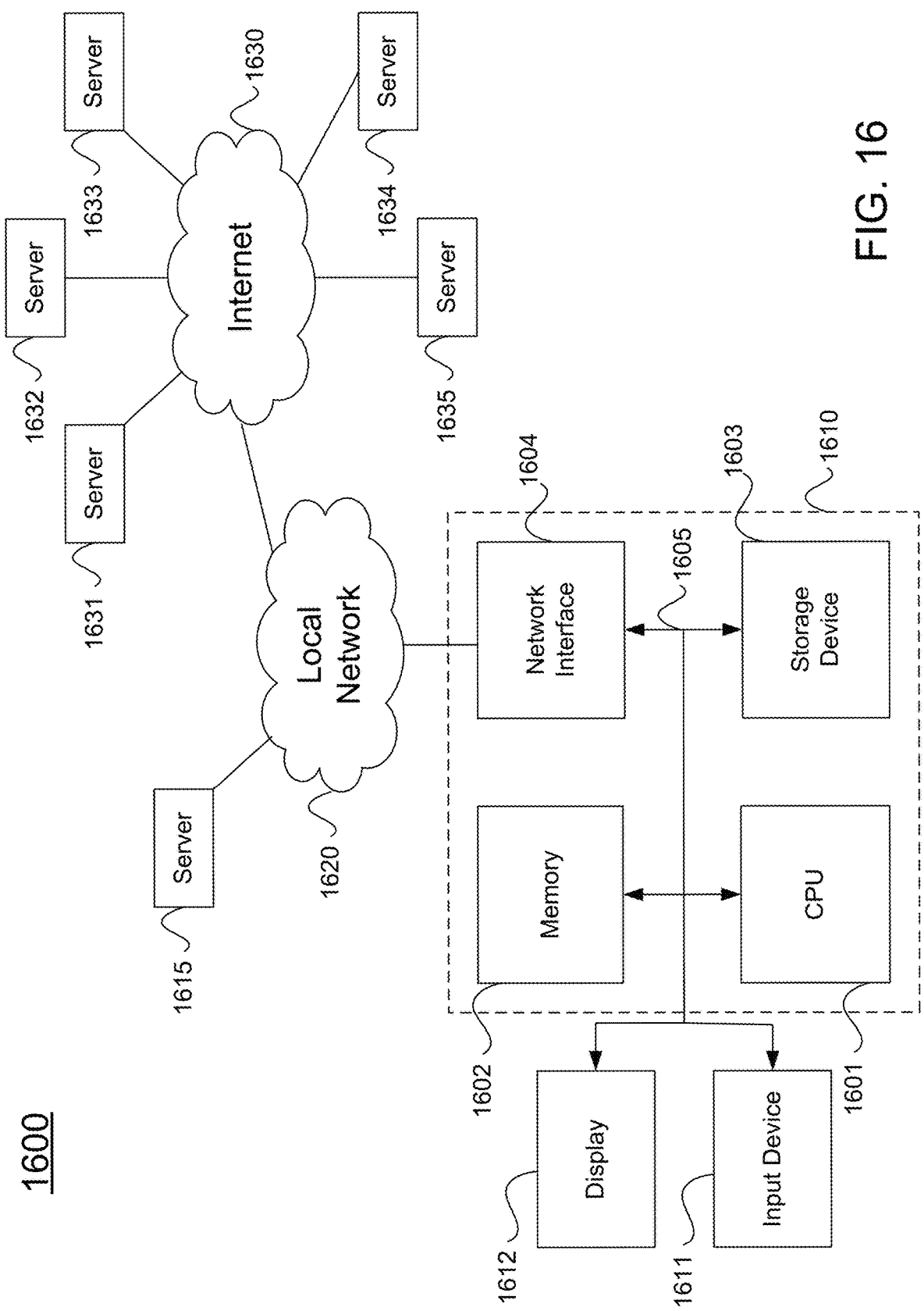
FIG. 16 illustrates an example computer system.

An example computer system 1600 is illustrated in FIG. 16. Computer system 1610 includes a bus 1605 or other communication mechanism for communicating information, and a processor 1601 coupled with bus 1605 for processing information. Computer system 1610 also includes a memory 1602 coupled to bus 1605 for storing information and instructions to be executed by processor 1601, including information and instructions for performing the techniques described above, for example. This memory may also be used for storing variables or other intermediate information during execution of instructions to be executed by processor 1601. Possible implementations of this memory may be, but are not limited to, random access memory (RAM), read only memory (ROM), or both. A storage device 1603 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1603 may include source code, binary code, or software files for performing the techniques above, for example. Storage device and memory are both examples of computer readable mediums.

Computer system 1610 may be coupled via bus 1605 to a display 1612, such as a cathode ray tube (CRT) or liquid crystal display (LCD), for displaying information to a computer user. An input device 1611 such as a keyboard and/or mouse is coupled to bus 1605 for communicating information and command selections from the user to processor 1601. The combination of these components allows the user to communicate with the system. In some systems, bus 1605 may be divided into multiple specialized buses.

Computer system 1610 also includes a network interface 1604 coupled with bus 1605. Network interface 1604 may provide two-way data communication between computer system 1610 and the local network 1620. The network interface 1604 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 604 sends and receives electrical, electromagnetic, or optical signals that carry digital data streams representing various types of information.

Computer system 1610 can send and receive information, including messages or other interface actions, through the network interface 1604 across a local network 1620, an Intranet, or the Internet 1630. For a local network, computer system 1610 may communicate with a plurality of other computer machines, such as server 1615. Accordingly, computer system 1610 and server computer systems represented by server 1615 may form a cloud computing network, which may be programmed with processes described herein. In the Internet example, software components or services may reside on multiple different computer systems 1610 or servers 1631-1635 across the network. The processes described above may be implemented on one or more servers, for example. A server 1631 may transmit actions or messages from one component, through Internet 1630, local network 1620, and network interface 1604 to a component on computer system 1610. The software components and processes described above may be implemented on any computer system and send and/or receive information across a network, for example.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1

Computer implemented system and methods comprising:
receiving a first request to a cloud system;
extracting an identifier from the first request;
determining a first compartment within a first zone of the cloud system, from a mapping in a non-transitory computer readable storage medium of a service mesh, the mapping between the identifier and the first compartment;
receiving from a registry of the service mesh, a first IP address of the first compartment; and routing the first request to the first IP address for processing by an application and a database within the first compartment.

Example 2

The computer implemented system and methods of Example 1, further comprising:
receiving a second request to the cloud system;
extracting the identifier from the second request;
determining a second compartment from the mapping;
receiving from the registry, a second IP address of the second compartment; and routing the second request to the second IP address for processing by the application within the second compartment.

Example 3

The computer implemented system and methods of Example 2, wherein:
the first compartment is a target compartment; and
the second compartment is a paired compartment within a second zone, wherein the mapping is updated to reflect a failure of a database within the first compartment, and wherein the second compartment includes a replicated database including contents of the database.

Example 4

The computer implemented system and methods of Example 2, wherein:
the first compartment is a target compartment; and
the second compartment is a paired compartment within a second zone,
wherein the mapping is updated to reflect a failure of the first zone, and wherein the second compartment includes a replicated database including contents of the database.

Example 5

The computer implemented system and methods of Example 2, wherein:
the first compartment is a target compartment; and
the second compartment is one of a split compartment and a merged compartment within the first zone,
wherein the mapping is updated to reflect a recommendation provided by a recommendation engine within the first compartment.

Example 6

The computer implemented system and methods of Example 5 wherein the recommendation is based upon a workload of the application.

Example 7

The computer implemented system and methods of any of Examples 1-6 wherein: wherein the first IP address is received from the service mesh via a client.

Example 8

The computer implemented system and methods of any of Examples 1-7 wherein:
the non-transitory computer readable storage medium comprises an in-memory database; and the routing is performed by an in-memory database engine of the in-memory database.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for workload management in a cloud system comprising:
receiving a first request to the cloud system;
extracting a first identifier from the first request;
providing a mapping in a service mesh between the first identifier and a first compartment within a first zone of the cloud system, wherein said first compartment is a target compartment;
receiving from a registry of the service mesh, a first IP address of the first compartment;
routing the first request to the first IP address for processing by an application and a first database within the first compartment;
providing a second compartment paired to the first compartment that includes a replicated database including the contents of the first database;
based upon determining a failure of the first database within the first compartment, updating the mapping in the service mesh to map the first identifier to the second paired compartment;
receiving a second request to the cloud system;
extracting the first identifier from the second request;
receiving from the registry of the service mesh, a second IP address of the second compartment; and
routing the second request to the second IP address for processing by an application within the second compartment.

2. The method of claim 1 further comprising:
receiving a third request to the cloud system;
extracting a second identifier from the third request;
providing a mapping in the service mesh between the second identifier and the second compartment of the cloud system;
routing the third request to the second IP address for processing by an application within the second compartment.

3. The method of claim 1 wherein the first IP address is received from the service mesh via a client.

4. The method of claim 1 wherein:
the service mesh comprises a non-transitory computer readable storage medium comprising an in-memory database; and
the routing is performed by an in-memory database engine of the in-memory database.

5. The method of claim 1 wherein:
the first database comprises an in-memory database; and
the routing is performed by an in-memory database engine of the in-memory database.

6. The method of claim 1, further comprising:
providing a third compartment, wherein the third compartment is one of a split compartment within the first zone and a merged compartment within the first zone; and
based on a recommendation provided by a recommendation engine, updating the mapping in the service mesh to map the first identifier to the third compartment.

7. The method of claim 6, wherein said recommendation engine analyzes an incoming workload.

8. The method of claim 7, wherein the third compartment is a split compartment when the recommendation engine determines there is an increased workload, and the third compartment is a merged compartment when the recommendation engine determines there is a decreased workload.

9. A non-transitory computer readable storage medium embodying a computer program for performing a method for workload management in a cloud system, said method comprising:
receiving a first request to the cloud system;
extracting a first identifier from the first request;
providing a mapping in a service mesh between the first identifier and a first compartment within a first zone of the cloud system, wherein said first compartment is a target compartment;
receiving from a registry of the service mesh, a first IP address of the first compartment;
routing the first request to the first IP address for processing by an application and a first database within the first compartment;
providing a second compartment paired to the first compartment that includes a replicated database including the contents of the first database;
based upon determining a failure of the first database within the first compartment, updating the mapping in the service mesh to map the first identifier to the second paired compartment;
receiving a second request to the cloud system;
extracting the first identifier from the second request;
receiving from the registry of the service mesh, a second IP address of the second compartment; and
routing the second request to the second IP address for processing by an application within the second compartment.

10. The non-transitory computer readable storage medium of claim 9 wherein the first IP address is received from the service mesh via a client.

11. The non-transitory computer readable storage medium of claim 9 further comprising
an in-memory database; and
the routing is performed by an in-memory database engine of the in-memory database.

12. The non-transitory computer readable storage medium of claim 9, further comprising:
providing a third compartment, wherein the third compartment is one of a split compartment within the first zone and a merged compartment within the first zone; and
based on a recommendation provided by a recommendation engine, updating the mapping in the service mesh to map the first identifier to the third compartment.

13. The non-transitory computer readable storage medium of claim 12, wherein said recommendation engine analyzes an incoming workload.

14. The non-transitory computer readable storage medium of claim 13, wherein the third compartment is a split compartment when the recommendation engine determines there is an increased workload, and the third compartment is a merged compartment when the recommendation engine determines there is a decreased workload.

15. A computer system for workload management in a cloud system comprising:
one or more processors;
a software program, executable on said computer system, the software program configured to cause an in-memory database engine of an in-memory database to:
receive a first request to the cloud system;
extract a first identifier from the first request;
provide a mapping in a service mesh between the first identifier and a first compartment within a first zone of the cloud system, wherein said first compartment is a target compartment;
receive from a registry of the service mesh, a first IP address of the first compartment; and
route the first request to the first IP address for processing by an application and a first database within the first compartment;
provide a second compartment paired to the first compartment that includes a replicated database including the contents of the first database;
based upon determining a failure of the first database within the first compartment, update the mapping in the service mesh to map the first identifier to the second paired compartment;
receive a second request to the cloud system;
extract the first identifier from the second request;
receive from the registry of the service mesh, a second IP address of the second compartment; and
route the second request to the second IP address for processing by an application within the second compartment.

16. The computer system of claim 15 wherein the in-memory database engine is further configured to:
receive a third request to the cloud system;
extract a second identifier from the third request;
provide a mapping in the service mesh between the second identifier and the second compartment of the cloud system;
route the third request to the second IP address for processing by an application within the second compartment.

17. The computer system of claim 15 wherein the first IP address is received from the service mesh via a client.

18. The computer system of claim 15 wherein the first compartment is named according to a namespace including a number of the first zone.

19. The computer system of claim 15, further comprising:
providing a third compartment, wherein the third compartment is one of a split compartment within the first zone and a merged compartment within the first zone; and
based on a recommendation provided by a recommendation engine, updating the mapping in the service mesh to map the first identifier to the third compartment.

20. The computer system of claim 19, wherein said recommendation engine analyzes an incoming workload,
   wherein the third compartment is a split compartment when the recommendation engine determines there is an increased workload, and
   wherein the third compartment is a merged compartment when the recommendation engine determines there is a decreased workload.

\* \* \* \* \*